Sept. 14, 1943.   E. P. JONES   2,329,270
METHOD OF FORMING SHAPED SURFACES ON METAL
MEMBERS AND ARTICLE PRODUCED THEREBY
Filed March 7, 1941
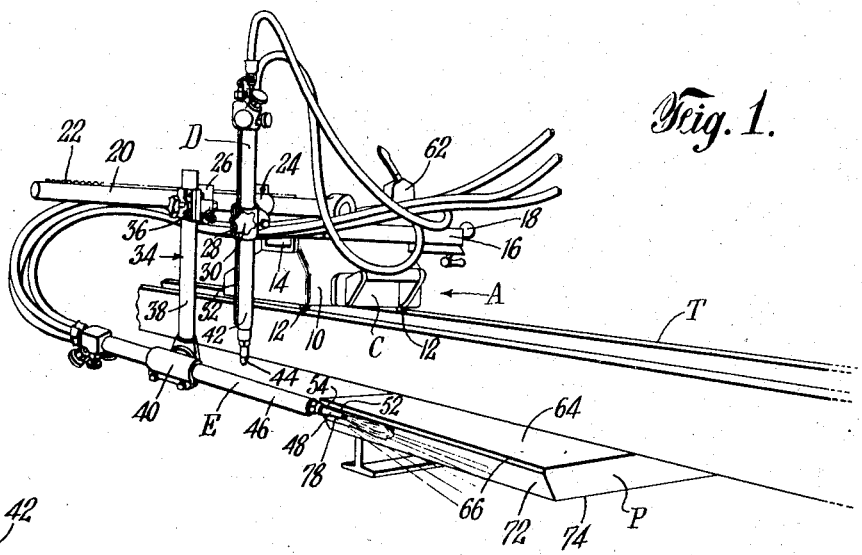
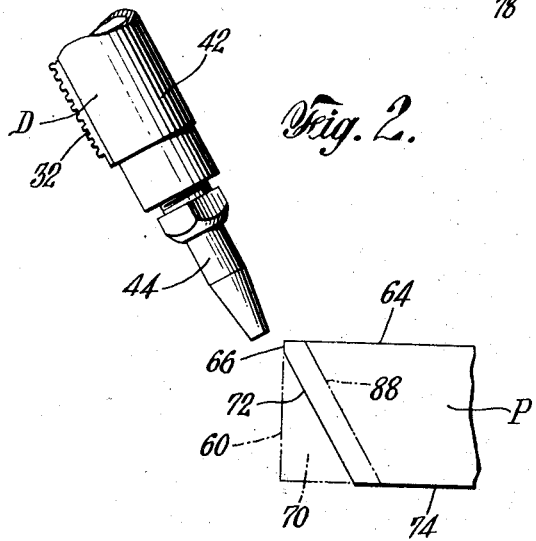
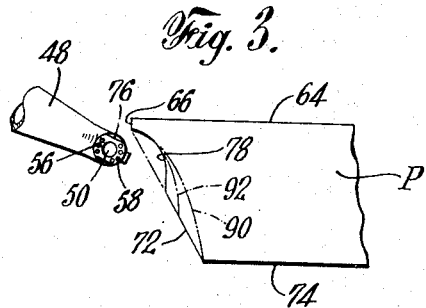
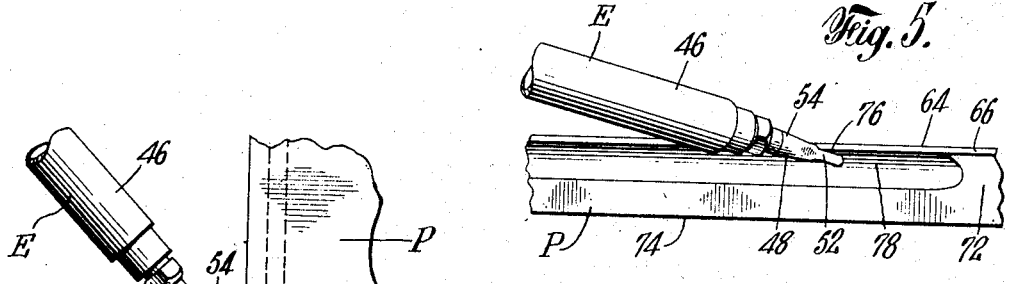
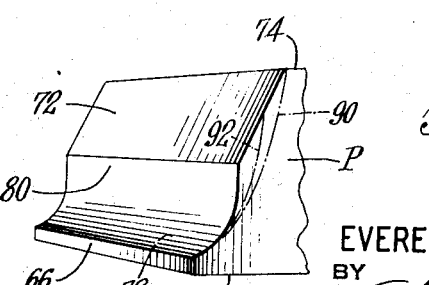
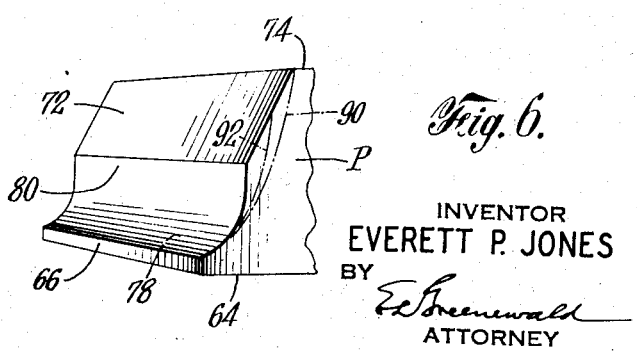
INVENTOR
EVERETT P. JONES
BY
ATTORNEY Patented Sept. 14, 1943

2,329,270

UNITED STATES PATENT OFFICE 2,329,270

METHOD OF FORMING SHAPED SURFACES ON METAL MEMBERS AND ARTICLE PRODUCED THEREBY

Everett P. Jones, Elizabeth, N. J., assignor to The Linde Air Products Company, a corporation of Ohio Application March 7, 1941, Serial No. 382,147

11 Claims. (Cl. 148—9)

This invention relates to a method of forming shaped surfaces on metal members and the article produced thereby, and more particularly to a method of preparing metal members for subsequent union by welding by producing on such members shaped surfaces having a predetermined contour.

In the joining of metal members, such as metal plates, by welding, and more particularly in the joining of such members by electric welding, it is both ordinary and necessary so to form at least one of the meeting surfaces of the members that when the surfaces are arranged for welding, a welding groove will be formed that will insure complete weld penetration throughout the entire thickness of the portions of the members to be joined. An accepted method for accomplishing this result on relatively thin plate has been to groove each edge surface to be joined substantially in the form of a hyperbola, thereby forming a J-groove. A short vertical section of the original edge surface usually is retained for alignment and to form the bottom of the groove. The groove is then filled with weld metal during the welding operation. In accordance with standard welding procedure, the short vertical section of the original edge surface is then removed, from the reverse side, either mechanically or thermochemically, and weld metal is deposited in the resulting small groove to complete the welded joint. The J-groove usually is used in making a corner or T joint wherein the shaped edge is positioned against a perpendicular plate surface.

In the butt welding of relatively heavy plate, however, the edge shaping procedure has usually consisted in forming a double bevel on each plate edge. When the plates are placed in abutment, a double V-groove is formed and the first step is to fill one of the V-grooves with weld metal. The root of the weld is then removed from the reverse side, and the resulting small groove and the other half of the double V-groove is then filled with weld metal to complete the joint. Although it has been used widely, the V-groove has a definite disadvantage in that it necessitates the use of a very small diameter welding rod when electrically welding the base of the groove, due to the converging surfaces of the groove. The small rod is necessary in order to insure proper penetration at the base; the size of the rod, however, being increased as the groove becomes filled. This procedure is costly because of the large number of interruptions in changing welding rods and the necessary cleaning of each layer of weld metal deposited before the succeeding layer is applied. It is obvious also that the amount of metal required to fill a V-groove sufficiently wide at its base to permit the use of a large diameter welding rod or electrode is far greater than that required to fill a U-groove of sufficient width to permit the use of a large diameter rod.

The single or double U-groove has been and often is used in the butt welding of heavy plate, and has been found to be satisfactory because it is sufficiently wide at its base to permit the depositing of metal from relatively large diameter rod. However, the methods employed for the shaping of an edge surface having a predetermined contour and suitable for use with a similarly shaped edge surface to form a U-groove have been costly, since all of the metal removed to form such a groove must be removed either by mechanical machining or by thermochemical reaction, wherein it is all removed by partial combustion of the steel and partial fusion due to the heat produced by the reaction.

One object of this invention, therefore, is to provide a metal member or article provided with a shaped surface having a novel predetermined contour and cooperative with a similarly shaped surface on another metal article to form a novel groove of advantageous contour to receive deposited weld metal.

Other objects of this invention are to provide an improved method of forming shaped surfaces having predetermined contours on relatively thick metal members; to provide a method of shaping the adjacent surfaces of relatively thick metal members to be welded so as to provide a welding groove suitable for use with either gas or electric fusion welding; to provide a method of forming shaped surfaces on metal members rapidly and economically; to provide, between adjacent surfaces of relatively thick metal members to be welded, a welding groove in which a relatively large diameter welding rod or electrode may be inserted to the full depth of the groove, insuring complete penetration at the bottom of the groove; and to provide, between adjacent surfaces of metal members to be welded, a welding groove relatively wide at its root and which requires a minimum removal of metal in its formation.

These and other objects of the invention will in part by obvious and in part become apparent from the following description and accompanying drawing, in which:

Fig. 1 is a perspective view illustrating one step in the method of the invention and one form of apparatus with which the method of the invention may be practiced;

Fig. 2 is an end elevational view, somewhat diagrammatic, illustrating a step in the method of the invention;

Fig. 3 is a view similar to Fig. 2 illustrating another step in the method of the invention;

Fig. 4 is a top plan view of the step illustrated in Fig. 3;

Fig. 5 is a side elevational view of the step illustrated in Fig. 3; and

Fig. 6 is a perspective view of a metal surface shaped according to the method of the invention.

In the forming of shaped edges on metal members to prepare them for welding, several factors have to be taken into consideration. In particular, the edges must be so shaped that when they are placed in abutment with similarly shaped edges to form a welding groove, the groove formed must have a contour and dimensions which will permit of adequate penetration when the welding is carried out from one side only of the members to be weld united.

Thus, the base of the groove must be sufficiently wide to allow the insertion of a welding electrode in electric welding, and of the blowpipe or torch and filler metal rod in gas welding. In addition, the groove must not be of excessive cross-sectional area, since the cross-sectional area of the groove to be filled determines not only the amount of metal to be removed but particularly the expenditure of time and material, as well as of electrical or gaseous energy, required in the welding operation. Finally, the shape or contour of the edge surfaces forming the groove must be of such a character that the edge shaping operation can be performed in a rapid and efficient manner.

In accordance with the principles of the present invention, metal is severed from a trimmed or untrimmed edge surface of a metal member, such as a plate, throughout substantially the entire depth thereof and in such a manner as to provide a shaped beveled surface sloping outwardly from a point on one main face of such plate to a point adjacent the other main face of such plate. Preferably, the shaped surface between the last-named point and the other main face of such plate is perpendicular to the main faces of the plate, thereby providing a lip portion useful in subsequent alignment of the shaped edge surface with a similarly shaped edge surface. Metal is then removed from the shaped surface adjacent such vertical or lip portion in such a manner that a groove of concavely curved cross-sectional contour is formed extending longitudinally of the shaped surface.

There is thus provided a metal member, such as a plate, adapted to be weld united to at least another similar plate, and which has along an edge face thereof a surface which slopes inwardly from a point on said edge face spaced from one of the main faces of the plate and extends to a point on the edge face between the main faces of the plate, such surface having a curved sectional contour. Along the remainder of the edge face of the plate, the shaped surface slopes inwardly from the above mentioned point between the main faces of the plate to the other main face of the plate, and this portion of the shaped surface is flat or plane.

When a plate having a surface so shaped is placed in abutment with a similarly shaped plate, a welding groove is formed, the walls of which diverge at a relatively large angle and at a substantially constantly decreasing rate from a point adjacent one main face of the abutting plates to a point between the main faces of the abutting plates; and at a relatively small angle and a constant rate of divergence from such point between the main faces of the plates to the other main face of the plates.

The edge shaping operation may be performed in any desired manner. For instance, metal may be removed from the trimmed or untrimmed edge of the plate by a mechanical operation, such as by shearing or planing. The groove in the shaped surface then may be formed by mechanical milling or other equivalent mechanical procedure.

Desirably, however, the edge is shaped thermochemically by oxy-acetylene preheating and subsequent oxidation of the heated metal. The metal may be severed, in the first step of the method, by directing preheating flames and a relatively high velocity oxygen cutting jet transversely and obliquely against the edge surface of the plate at a point spaced from one of the main faces of the plate. By moving the oxygen jet longitudinally of the edge surface, the metal may be severed therefrom leaving a beveled surface between the main faces of the plate with a small vertical section remaining adjacent one main face of the plate. By increasing the intensity of the heating flames accompanying the cutting jet, the small substantially vertical surface may be formed by the melting of the metal adjacent the upper lip of the kerf, such melting being more intense as desired along one upper edge of the kerf due to the angular relation of the cutting nozzle to the upper surface of the plate.

To form the groove in the shaped surface, preheating flames and a relatively low velocity oxygen stream are directed obliquely against and along the shaped surface adjacent the vertical portion thereof to gouge metal from the shaped surface. The first step may be performed by what is known as an oxygen cutting operation and the second step by what is known as an oxygen flame machining operation.

While the edge may be completely shaped either mechanically or thermochemically, as by oxidation of the molten metal, it will be obvious that any combination of mechanical metal removing steps and thermochemical metal removing steps may be used.

One form of apparatus with which the novel method of the invention may be practiced is illustrated in Fig. 1 in operative relation to the work. In its preferred form, the apparatus A may comprise a movable carriage C mounted on a track T which may be suitably supported as by resting upon a member, such as plate P, having an edge surface to be shaped. The carriage C may be moved along the track T either manually or by power actuated mechanism, and mounted on the carriage are a cutting blowpipe D and a flame machining blowpipe E.

In operation, the carriage C is positioned adjacent an end of the edge face to be shaped and the cutting blowpipe D is arranged to direct preheating flames and a high velocity oxygen cutting jet transversely and obliquely against such edge face. The various gases are turned on by suitable mechanism, and after a period of time sufficient to properly preheat the work, the cutting oxygen valve is opened and the carriage C is moved along the track T, whereupon metal will be severed from the plate edge to form the sloping or beveled surface thereon as described above.

When the severing operation has been completed, the carriage C is retracted to its initial position, and the flame machining blowpipe E is adjusted into operative relation with the beveled surface. The preheating gases for the blowpipe E are then turned on, and after a suitable interval, sufficient for adequate preheating of an initial portion of the shaped surface, the oxygen valve is opened so that the blowpipe E will direct a low velocity stream of oxygen gas obliquely against and along the surface to be shaped. As the carriage C is moved longitudinally of the surface to be shaped, the low velocity stream of oxygen gas from the blowpipe E removes metal from the shaped surface by liquefaction, leaving a groove of curved sectional contour extending longitudinally of the shaped beveled surface.

Referring more particularly to the drawing, and particularly to Fig. 1 thereof, the carriage C comprises a body 10 mounted on wheels 12 for movement along the track T. On the upper surface of the body 10 is a guide 14 in which is mounted a slide 16 adjustable transversely of the body 10 by means of mechanism actuated by a handle 18.

Mounted on the slide 16 is a laterally projecting support 20, preferably in the form of a tubular member with a rack 22 secured thereto. Slides 24 and 26 are mounted on the support 20 and are adjustable therealong by suitable means cooperating with the rack 22. On the slide 24 is secured a bracket 28 in which is mounted for vertical adjustment the cutting blowpipe D which may be of the type customarily used for machine cutting operations and vertically adjustable in the bracket 28 by means of a gear actuated by a knob 30 and engaging a rack 32 on the blowpipe.

The slide 26 supports a substantially universally adjustable mounting member 34 for the blowpipe E. Member 34 may comprise a clamp 36 secured to the slide 26 and engaging a vertically movable member 38. At its lower end, the member 38 adjustably supports a sleeve 40 which clampingly engages the blowpipe E.

The machine cutting blowpipe D may be of the usual construction including a body 42 and a cutting nozzle 44 provided with preheating orifices and a central cutting gas orifice (not shown).

The blowpipe E may be of the type customarily used for surface metal removal, such as in deseaming, gouging, and grooving. It includes a body 46 and a nozzle 48. A central oxidizing gas passage extends longitudinally of the nozzle from its inlet to the discharge orifice 50, bending at the juncture of a short outer section 52 and the main portion 54 of the nozzle. At the diametrically opposite top and bottom walls of the nozzle are two groups of combustible gas passages 56 and 58, respectively, which extend longitudinally of the nozzle, bending in a similar manner to the central passage at the juncture of the short outer section 52 and the main portion 54 of the nozzle. Nozzles of this character are described and claimed in my copending application, Serial No. 254,205, filed February 2, 1939, now Patent No. 2,258,456, issued October 7, 1941.

In performing the method of the invention with the above described apparatus, the blowpipe D is adjusted, as illustrated in Fig. 2, so that the axis of the cutting oxygen passage of the nozzle 44 is directed transversely of and obliquely against the edge 60 of the plate P at an angle of approximately 30° to the vertical. A preheating gas mixture is then supplied to the nozzle 44 by actuating a valve mechanism 62, a typical embodiment of which is illustrated generally in Fig. 1. After a suitable time for preheating a small area of the metal of the edge 60 to an ignition temperature, cutting gas, such as oxygen, is supplied to the cutting gas passage of the nozzle 44 by which it is directed against the edge 60 as heretofore described. The blowpipe D preferably is so positioned that the cutting gas jet will strike the edge face 60 at a short distance below a main face 64 of the plate P, leaving a short vertical section 66 adjoining the main face. Carriage C then is moved along the track T, either manually or mechanically by the driving mechanism customarily used in oxygen cutting machines. The cutting gas jet severs a body of metal 70 from the plate P forming a beveled shaped surface 72 which slopes outwardly from a point on one main face 74 of the plate P to a point adjacent the other main face 64.

If the severing operation is to be performed on an untrimmed edge, the intensity of the preheating flames accompanying the cutting jet is increased to produce a slight liquefaction of the upper edge of the face 60 to form the short substantially vertical section 66, which is used for alignment purposes in welding operations. An alternative procedure when the method is performed on untrimmed plate, is to make, preferably simultaneously, a secondary cut at right angles to the main faces of the plate P, thereby forming a trimmed edge surface on the plate. The beveled surface 72 also may be formed by cutting diagonally through the plate from one main face to the other, as indicated by the broken line 88 in Fig. 2, increasing the preheating flame intensity to form the section 66 by liquefaction.

After the beveled or sloping surface 72 has been formed on the edge face 60, the gas supply to the blowpipe D is interrupted and the carriage C is returned to its starting position. The blowpipe E, by means of the universally adjustable mounting member 34 previously described, is arranged in operative relation to the work to perform the second step of the edge shaping operation. Preferably, the member 38 and the sleeve 40 are adjusted vertically so that the nozzle 48 is positioned near the intersection of the short vertical section 66 and the shaped surface 72, and are held in the adjusted position by means of the clamp 36. The blowpipe E is then turned in a substantially horizontal plane so that the axis of its body portion 46 is at an angle of substantially 43° to the edge face 60 (Fig. 4). The blowpipe E is then adjusted in a substantially vertical plane so that the axis of the body portion 46 is at an angle of substantially 15° to the main face 64 of the plate P (Fig. 5), and at the same time the blowpipe is so adjusted that the flat face 76 on the nozzle 48 is at an angle of substantially 25° to the main face 64 (Fig. 3).

A preheating gas mixture is then supplied to the combustible gas passages 56 and 58 by a valve mechanism similar to the mechanism 62, and after the starting end of the work has been preheated for a sufficient period of time to the ignition temperature, a low velocity stream of oxygen is discharged from the orifice 50. The carriage C is then actuated to traverse the track T, whereupon the low velocity oxygen stream thermochemically reacts with and partially liquefies the preheated metal of the surface 72 to remove a portion of the same forming a groove 78 therein, having a curved sectional contour and extending longitudinally of the surface 72.

It will be noted, from Fig. 3, that such grooved surface slopes inwardly from the intersection of the surface 72 with the short vertical section 66 and then downwardly, terminating at a point in the surface 72 substantially intermediate between the main faces 64 and 74 of the plate P. At the completion of the grooving or gouging operation, the gas supply to the blowpipe E is interrupted and the carriage C returned to its initial position.

It will be observed that the edge shaping method described above has several advantageous features which contribute to the economy and efficiency of the shaping operation and to the economy of the resultant welding operation. When the shaped surface 80, comprising the short vertical section 66, the groove 78 and the surface 72, is arranged in adjacent relationship to a similar surface, a welding groove of a novel and advantageous contour is formed. The short vertical section 66 forms a lip which is of utility in aligning the members to be welded. The groove 78 insures a sufficient width of the welding groove to permit the insertion of a large diameter welding electrode or a blowpipe and filler metal rod at the base of the groove. At the same time, the groove is of minimum cross-sectional area consistent with insuring sufficient base width of the welding groove to permit proper penetration. Thereby, the expenditure of time and material, as well as of electrical or gaseous energy, required in the subsequent welding operation is kept at a minimum. By first beveling the edge face 60, only a minimum amount of metal need be severed from the plate P, as the angle of the beveled surface with relation to the ordinary trimmed surface of the edge 60 is notably less than would be required if the welding groove to be formed comprised straight beveled sides. Similarly, only a relatively small amount of metal is oxidized and liquefied from the shaped surface 72 to provide the groove 78, in marked contrast to former procedures for forming J-sections on plate edges to provide U-grooves. In such former procedures, as explained above, substantially all of the metal removed had to be subjected to partial oxidation, requiring a considerable expenditure of time and energy and greater consumption of gases in shaping the plate edge, particularly as the shaping operation usually had to be performed in several successive passes of a flame machining blowpipe or by several successive cuts by a mechanical milling cutter. The provision of the groove 78 permits the beveled surface 72 to be at a much smaller angle to the vertical than would otherwise be necessary to insure adequate penetration at the base or root of the welding channel or groove.

In a typical edge shaping operation according to the present invention, the shaped surface shown in Fig. 6 was produced under the following conditions: The plate to be shaped was untrimmed so that a preliminary straight cut, at right angles to the main faces of the plate, was made with a No. 6 precision nozzle, supplied with cutting oxygen at 32 p. s. i., at a speed of 11 inches per minute. The beveled cut was then made with a four flame No. 8 nozzle, supplied with cutting oxygen at 36 p. s. i., at a speed of 7 to 9 inches per minute, with a longer preheat. In the final operation, the groove 78 was formed with a No. 25 gouging nozzle, supplied with cutting oxygen at 40 p. s. i., at a speed of 8 inches per minute. These data were for a metal plate 2 inches thick. It should be understood that the data given are exemplary of a particular shaping operation only and that different oxygen pressures, nozzle sizes, and speeds of shaping, probably will be required under different conditions.

It should be understood that the groove 78 need not necessarily terminate between the main faces of the plate but may extend from the short substantially vertical section 66 to the main face 74, dependent upon the thickness of the plate to be shaped. Thus, in the shaping of plates up to and including 1½″ in thickness, the groove 78 will extend from the section 66 to the main face 74, as shown by the broken lines 90 in Figs. 3 and 6. In plates thicker than 1½″, the groove 78 will terminate between the faces 64 and 74 at a point dependent upon the plate thickness, as indicated by the broken lines 92 in Figs. 3 and 6. In all cases, however, the plate edge is shaped by means of a beveling cut followed by a gouging or grooving operation.

While the invention has been described particularly as embodying thermochemical processes for removing the metal to form the shaped edges, it should be understood, as previously stated, that the edges may be shaped mechanically by a shearing or planing operation followed by a milling operation, or by a combination of thermochemical metal removal and mechanical metal removal. Also, while a particular apparatus has been described in order to illustrate how the invention may be practiced, the method of the invention may be performed with other apparatus of equivalent character.

What is claimed is:

1. A method of forming a shaped edge on a metal member to prepare the same for welding, which comprises severing a portion from said member by flame cutting lengthwise of an edge face thereof, such cut surface sloping outwardly from one main face of said member to a point on said edge face adjacent the other main face of said member; and applying a low velocity gaseous metal removing medium against such cut surface adjacent said point on said edge face to form a groove along and in such cut surface.

2. A method of forming a shaped edge on a metal member which comprises cutting metal from an edge face thereof to form a beveled surface extending between the main faces of said member; and removing metal from said beveled surface to form a groove extending lengthwise of said beveled surface.

3. A method of forming a shaped edge on a metal member which comprises progressively applying a high velocity cutting oxygen jet to an edge face of said member to form a beveled surface extending between the main faces of said member; and then progressively applying a low velocity oxygen machining jet along a portion of said beveled surface to form a groove extending longitudinally of said surface.

4. A method of forming a shaped surface on an untrimmed edge face of a metal member which comprises progressively applying a high velocity cutting oxygen jet perpendicularly against a main face of said member in a direction parallel to said untrimmed edge face; progressively applying a high velocity cutting oxygen jet at an angle to such edge face to form a beveled surface between the main faces of said member; and progressively applying a low velocity oxygen machining jet along a portion of said beveled surface to form a groove extending longitudinally of said surface.

5. A method of forming a shaped surface on a metal member which comprises severing metal from an edge face of said member in such a manner as to leave a beveled surface extending from one main face of said member toward the other main face thereof and a surface joining said beveled surface to the other main face of said member and perpendicular to said main faces; and removing metal from said beveled surface adjacent such perpendicular surface to form a groove extending longitudinally of said beveled surface.

6. A method of forming a welding groove which comprises shaping the adjacent edges of a pair of metal members to be weld united in such a manner that, when such shaped edges are placed in substantial abutment, a welding groove is formed having a U-section at its base merging into a V-section at the upper surface of such members.

7. A method of forming a welding groove which comprises shaping the adjacent edges of a pair of metal members to be weld united in such a manner that, when such shaped edges are placed in substantial abutment, a welding groove is formed having a relatively wide root with substantially vertical walls for a portion of its depth, the walls of such groove flaring outwardly adjacent the upper portion of the groove.

8. For use in welding operations, a metal member having a shaped edge surface, the lower portion of which is a J-section in cross-sectional contour and the upper portion of which slopes inwardly from the upper end of such J-section to the upper main face of the member.

9. A method of forming a shaped surface on an edge face of a metal plate which comprises cutting metal from such edge face throughout substantially the entire depth thereof to provide a shaped surface sloping outwardly from a point on one main face of such plate to a point adjacent the other main face of such plate; and then removing metal from such shaped surface between said last-named point and a point between the main faces of such plate.

10. A metallic plate adapted to be weld united to at least one other similar plate, said plate having along an edge face thereof a surface which slopes inwardly from a point on said edge face spaced from one of the main faces of said plate and extends to a point on said edge face between the main faces of said plate, said surface having a curved sectional contour; and said plate having along the remainder of said edge face a surface which slopes inwardly from said point between the main faces of said plate to the other main face of said plate, said last-named surface being plane.

11. A metallic plate adapted to be weld united to at least one other similar plate, said plate having along an edge face thereof a flame cut surface which slopes outwardly from one of the main faces of said plate and extends to a point between the main faces of said plate, said flame cut surface being plane and formed by progressively and concurrently applying a heating medium and a high velocity stream of oxygen transversely of the initial edge surface of said plate; and a flame machined surface which slopes outwardly from said point between the main faces of said plate and extends to a point spaced from the other of the main faces of said plate, said flame machined surface having a curved sectional contour formed by progressively and concurrently applying a heating medium and a low velocity stream of oxygen lengthwise of the said flame cut surface.

EVERETT P. JONES.